United States Patent

Fukase et al.

[11] Patent Number: 5,926,578
[45] Date of Patent: Jul. 20, 1999

[54] IMAGE PROCESSOR HAVING A PARTIAL IMAGE PREPROCESSOR

[75] Inventors: Masayuki Fukase; Kimihiro Nakatsuka, both of Kyoto, Japan

[73] Assignee: Dainippon Screen Mfg. Co., Ltd., Japan

[21] Appl. No.: 08/735,426

[22] Filed: Oct. 22, 1996

[30] Foreign Application Priority Data

Oct. 25, 1995 [JP] Japan .................................. 7-277759

[51] Int. Cl.[6] .................................................. G06K 9/40
[52] U.S. Cl. .......................................... 382/266; 382/260
[58] Field of Search ................................... 382/260–269, 382/128, 132

[56] References Cited

U.S. PATENT DOCUMENTS

| | | | |
|---|---|---|---|
| 4,794,531 | 12/1988 | Morishita et al. | 364/413.13 |
| 4,987,602 | 1/1991 | Brunner et al. | 382/254 |
| 5,128,879 | 7/1992 | Greve et al. | 382/167 |
| 5,343,390 | 8/1994 | Doi et al. | 382/132 |
| 5,454,044 | 9/1995 | Nakajima | 382/132 |
| 5,454,053 | 9/1995 | Okubo et al. | 382/132 |
| 5,524,162 | 6/1996 | Levien | 382/263 |

FOREIGN PATENT DOCUMENTS

712092   5/1996   European Pat. Off. .

Primary Examiner—Thomas D. Lee
Assistant Examiner—Stephen Brinich
Attorney, Agent, or Firm—Ostrolenk, Faber, Gerb & Soffen, LLP

[57] ABSTRACT

Overall actual image data is divided into tiles, spatial frequency distribution states of respective tiles are analyzed, and three extracted images including an image (95A) having the maximum number of high frequency components, an image (95C) having the minimum number of high frequency components and an image (95B) including the intermediate number of high frequency components are displayed on an extracted image display screen (91B). When a user inputs candidate values for contour enhancement processing parameters as to the three extracted images, contour enhancement processing is performed on the respective extracted images in response to this. When the candidate values for the parameters are ascertained, contour enhancement processing is performed on the overall actual image in response to this, and the image is displayed on a display box (51). Thus, an image processor having a short contour enhancement processing time with excellent sharpness tuning efficiency is provided.

18 Claims, 9 Drawing Sheets

IMAGE PROCESSOR HAVING A PARTIAL IMAGE PREPROCESSOR

BACKGROUND OF THE INVENTION

1. Field of the Invention

The present invention relates to an image processor for performing image transform processing such as contour enhancement processing.

2. Background of the Invention

In general, transformation for sharpening the characteristics of an image or enhancing lines and edges, i.e., image sharpening is performed in image processing. This image sharpening is performed by increasing density difference at a boundary portion in a boundary region of an image having constant density difference (hereinafter referred to as "contour enhancement processing").

In the aforementioned contour enhancement processing, a signal (hereinafter referred to as "main signal M") of a noted pixel P and an averaged signal (hereinafter referred to as "unsharp signal U") in a neighbor region R (which may include the noted pixel P) for the noted pixel P are extracted from the image, and a difference signal (M−U) therebetween is regarded as a base signal (hereinafter referred to as "unsharp mask signal") for contour enhancement. In general, the unsharp mask signal is multiplied by an appropriate coefficient k to amplify the unsharp mask signal. The strength of contour enhancement (hereinafter referred to as "sharpness") is optimized by varying the coefficient k. And the amplified unsharp mask signal (hereinafter referred to as a contour enhancement signal k×(M−U)) is added to the main signal M for forming image data of the noted pixel P, thereby improving the sharpness (this contour enhancement is hereinafter referred to as "unsharp masking (USM)").

When an image processor having the aforementioned USM function is used, the user adjusts USM parameters (the size of the aforementioned neighbor region R, the coefficient k and the like) while observing the image on the display or a result of printing, thereby tuning the sharpness.

In general, an image (hereinafter referred to as "coarse image") obtained by culling out pixels for attaining improvement in efficiency of the processing is displayed on a display. In case of image processing accompanied by printing, however, the degree of application of the aforementioned USM on the coarse image is different from that on the printed image, and hence the USM state cannot be confirmed from the coarse image on the display. In general, therefore, USM is adjusted by observing the image (hereinafter referred to as "actual image") which is adjusted to have the same resolution as printing has. At this time, the USM processing is performed as to all pixels of the image every time the user changes the USM parameters, and hence the USM processing time is lengthened in the actual image having a large number of pixels in the overall image. Particularly when the USM parameters are adjusted by trial and error, the processing efficiency is reduced significantly.

In general, further, the user finds out a noted portion of the image for tuning and confirming the USM state. However, the operation of finding out the noted portion of the image depends greatly on the user's skill. Therefore, the result of confirmation of the sharpness varies with the operator, while it is extremely difficult for an unskilled user to tune the sharpness.

SUMMARY OF THE INVENTION

The present invention is directed to an apparatus for applying a predetermined image processing to an image consisting of pixels.

According to the present invention, the apparatus comprises a) analyzing means for analyzing the image statistically, b) sampling means for sampling a specific partial image from the image on the basis of a result of the analyzing, c) display means for displaying the specific partial image, d) inputting means for inputting a tentative value for the image processing, e) pre-processing means for applying the image processing to the specific partial image on the basis of the tentative value; to thereby obtain a processed partial image, f) control means for controlling the display means to display the processed partial image, g) determining means for determining a definite value for the image after receipt of approval of the tentative value, and h) applying means for applying the image processing to the image on the basis of the definite value.

Setting of the image transform parameters is simplified and the time required for the image transform processing is shortened.

In an aspect of the present invention, the image processing is unsharp masking process. The analyzing means includes a-1) detecting means for detecting distribution of spacial frequency of image signals for a plurality of partial images of the image, and the sampling means samples the specific partial image from the plurality of partial images of the image on the basis of the distribution of spacial frequency.

In another aspect of the present invention, the sampling means includes means for calculating an average of the distribution of spacial frequency for each of the respective partial images of the image, and means for selecting 1) a first partial image of the image providing a maximum of the average among the respective partial images of the image, and 2) a second partial image of the image providing a minimum of the average among the respective partial images of the image, and means for determining the specific partial image as including the first and second partial images of the image.

The present invention is also directed to a method of applying a predetermined image processing to an image consisting of pixels.

Accordingly, an object of the present invention is to provide an image processor which is excellent in efficiency of adjustment such as sharpness tuning with a short processing time for USM or the like, in consideration of the aforementioned problems.

Another object of the present invention is to provide an image processor through which even an unskilled user can readily perform image transform adjustment such as uniform sharpness tuning.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An exemplary embodiment of the present invention is now described in detail with reference to the drawings.

A. Schematic Structure of Processor

Figure 1:
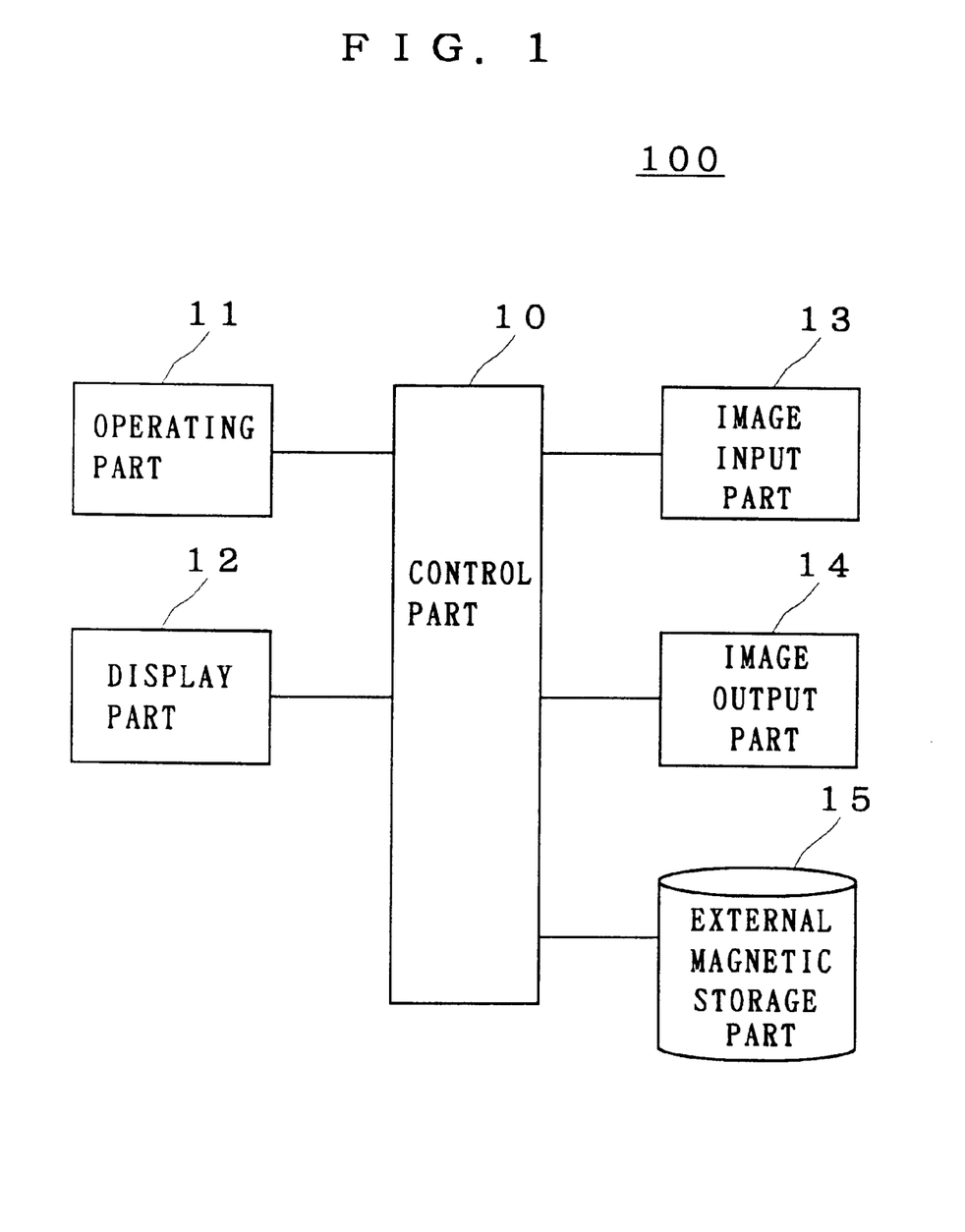
FIG. 1 is a block diagram showing the overall structure of an image processor according to an embodiment of the present invention.
Figure 2:
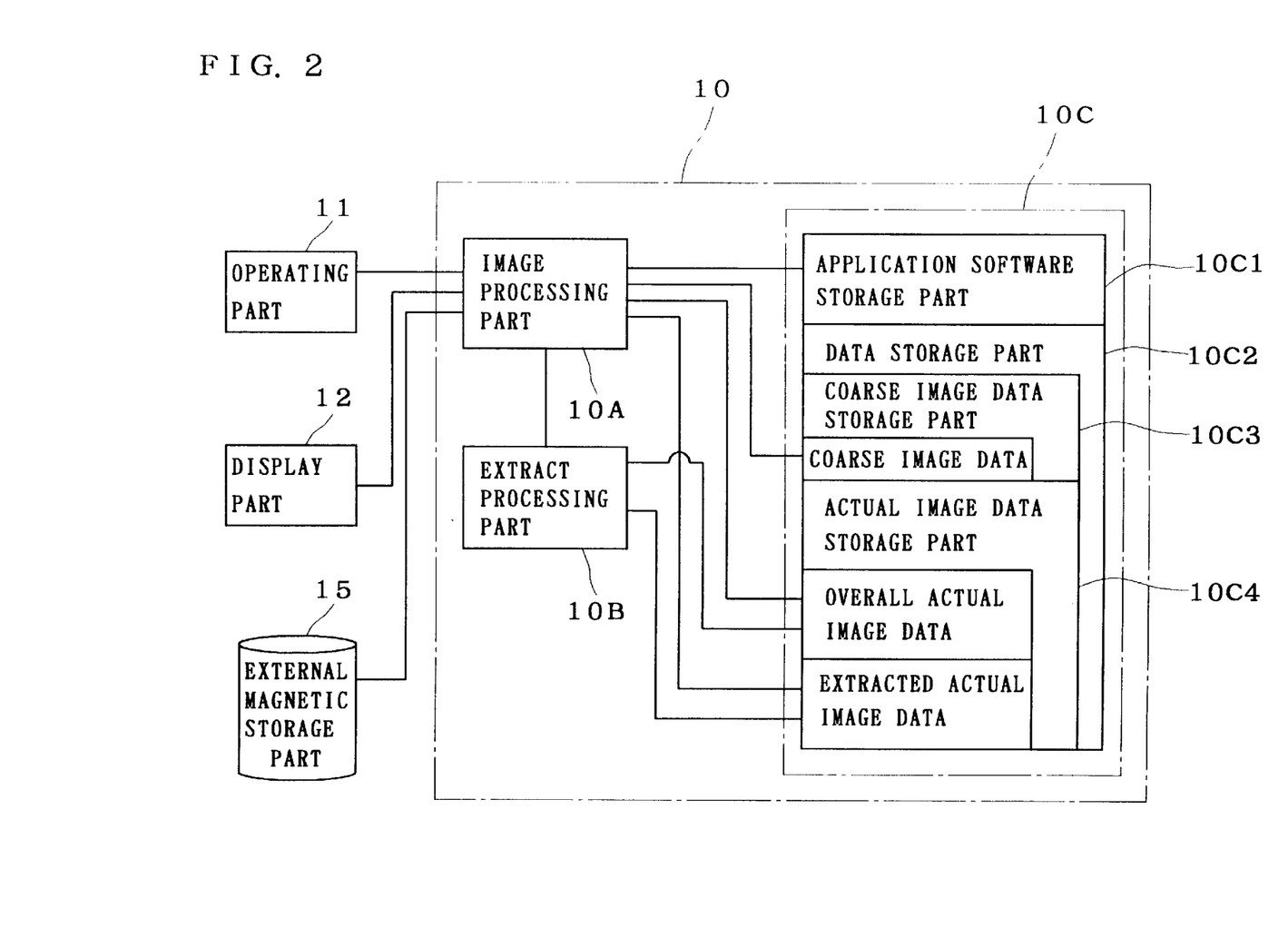
FIG. 2 is a block diagram showing the structure of a control part in FIG. 1.

FIG. 1 is a block diagram showing the overall structure of an image processor 100 according to an example of the present invention described with reference to this embodiment, and FIG. 2 is a block diagram showing the structure of a control part 10. This image processor 100 comprises an image input part 13 and an image output part 14, in addition to the control part 10. The image input part 13 is an image input unit (an input scanner, for example), and has a function of incorporating image data (i.e. image signals) from an original image on the basis of an instruction from the control part 10. On the other hand, the image output part 14 is an output scanner, and has a function of outputting a processed image on a photosensitive material as a halftone dot image on the basis of an instruction from the control part 10.

An operating part 11 and a display part 12 accompany the control part 10. The operating part 11 is structured by a keyboard and a mouse, and the display part 12 is a display unit. The user can supply instructions etc. to the control part 10 through the operating part 11, and confirm an original image, a transformed image and the like on the display through the display part 12, as described later.

Further, the control part 10 is connected to an external magnetic storage part 15, so that the original image and image data after transform processing can be preserved.

The structure of the control part 10 will now be described. As shown in FIG. 2, the control part 10 comprises an image processing part 10A, an extract processing part 10B and an internal storage part 10C. The internal storage part 10C is provided with an application software storage part 10C1, as well as a data storage part 10C2. The image processing part 10A receives a user's instruction from the operating part 11 on the basis of application software which is stored in the application software storage part 10C1, performs image processing such as USM and culling pixels of the image data preserved in the data storage part 10C2, displays the processed image on the display part 12, and preserves the image data in the data storage part 10C2 and the external magnetic storage part 15 as needed. At this time, coarse image data is stored in a coarse image storage part 10C3 which is provided in the data storage part 10C2, and actual image data is stored in an actual image data storage part 10C4. The actual image data storage part 10C4 stores the overall actual image as overall actual image data, as well as an extracted partial image described later as extracted actual image data.

When an image extract instruction is received through the image processing part 10A, the extract processing part 10B extracts a partial image from the overall actual image data stored in the actual image data storage part 10C4 by a method described later, and stores the same in the actual image data storage part 10C4 as extracted actual image data.

B. Procedure

Figure 3:
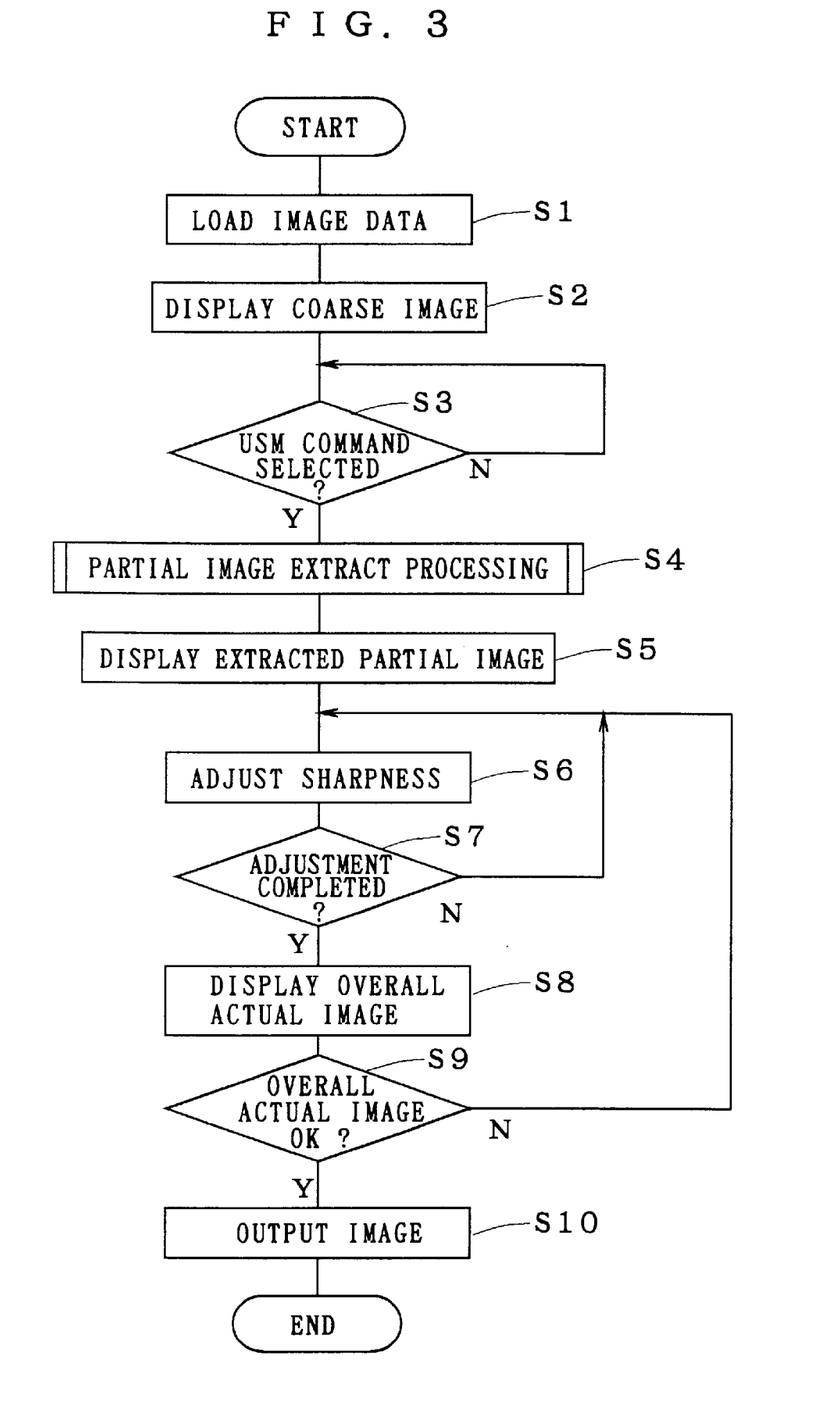
FIG. 3 is a flow chart for illustrating the operation of the image processor according to this example.
Figure 4:
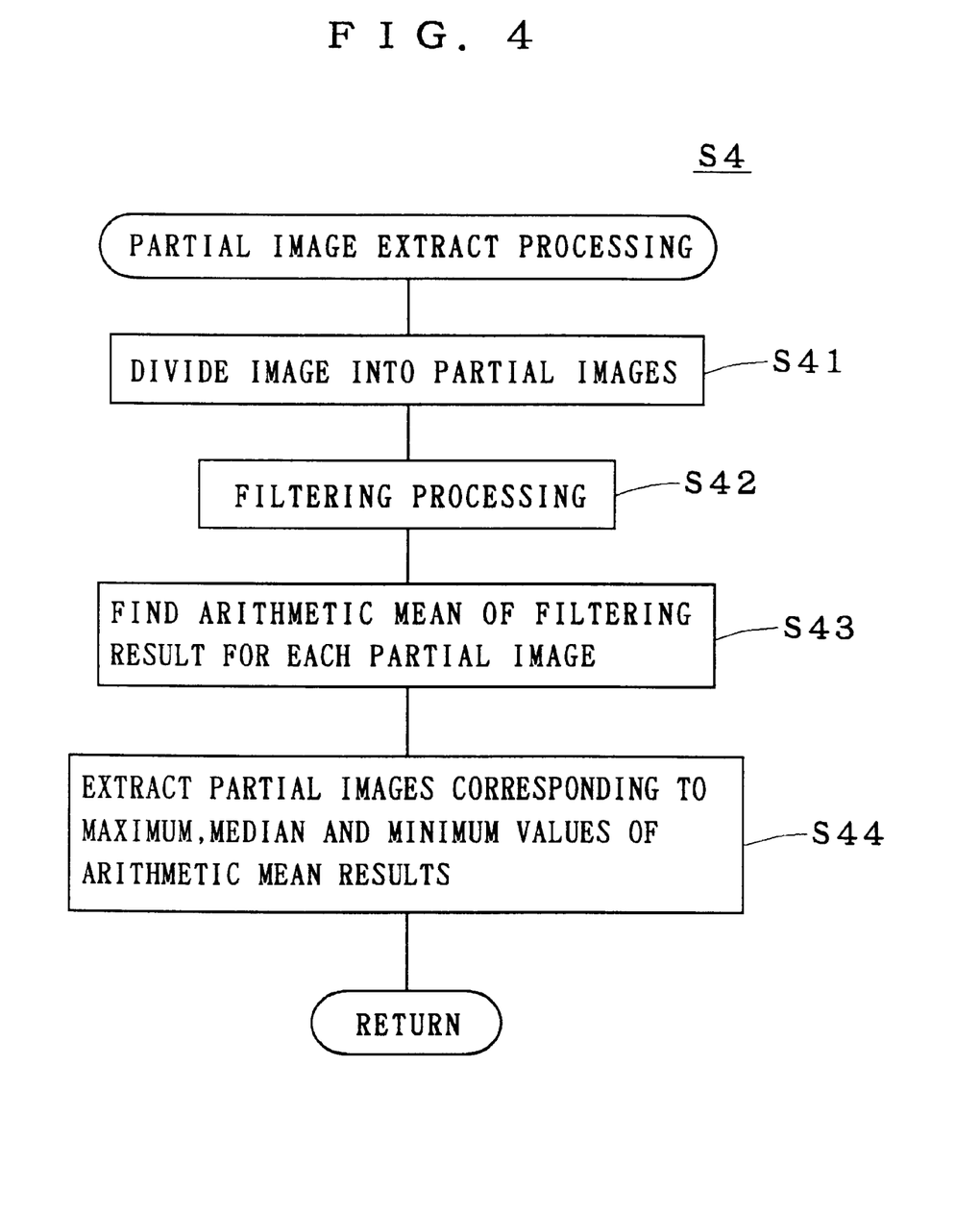
FIG. 4 is a flow chart showing an exemplary routine of partial image extraction.

With reference to the drawings, an exemplary image processing procedure of the inventive image processor 100 is now described. FIGS. 3 and 4 are flow charts showing the image processing procedure.

When the user uses the image processor 100, image data for this image processing is loaded (step S1). At this time, the image data may be inputted from the image input part 13 shown in FIG. 1, or image data previously preserved in the external magnetic storage part 15 may be loaded. The loaded data is stored in the actual image data storage part 10C4 of FIG. 2 as overall actual image data, while the same is also preserved in the external magnetic storage part 15 when this image data is inputted from the image input part 13.

Figure 5:
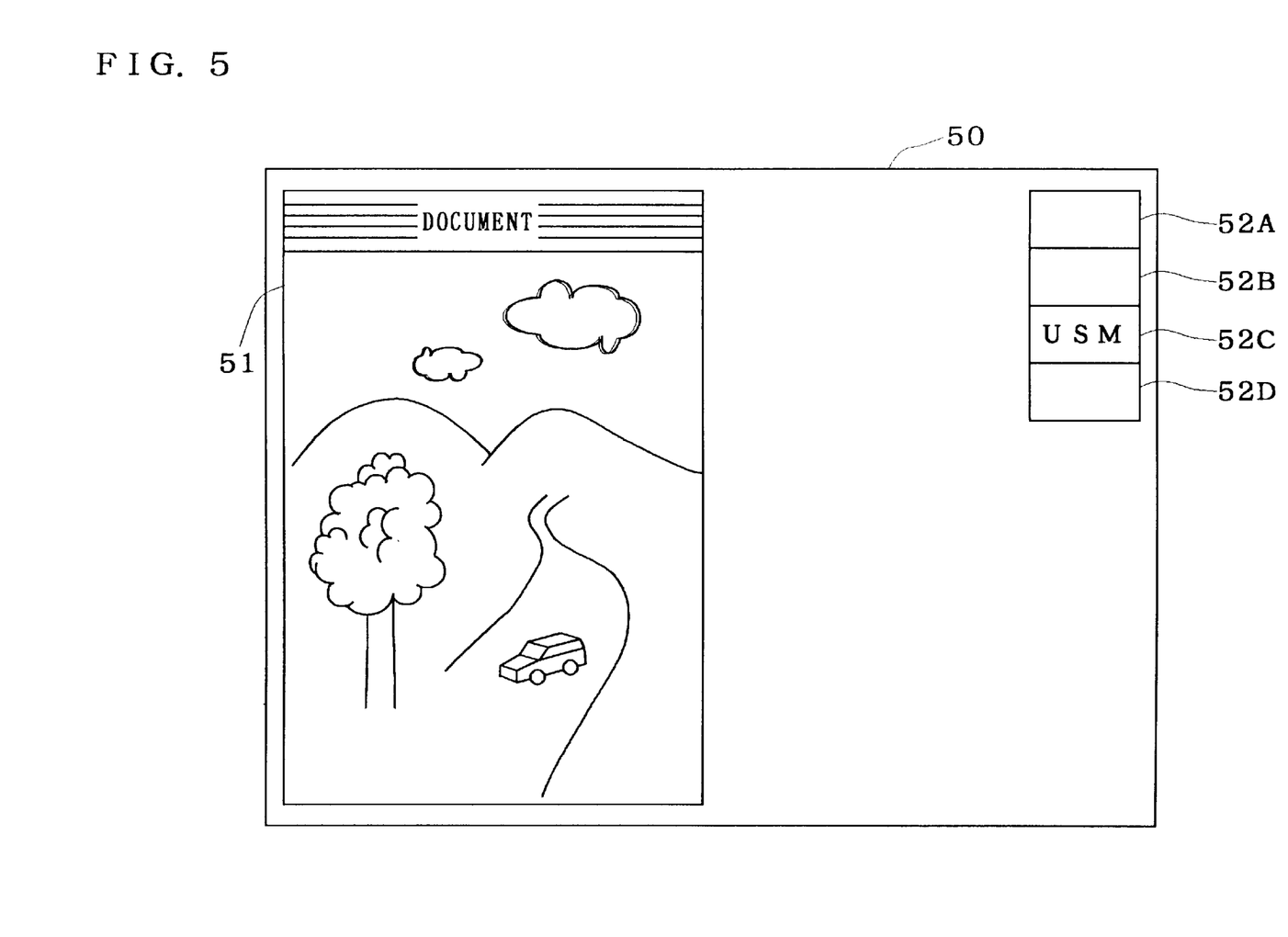
FIG. 5 is a diagram showing an exemplary display state in a display part.

Then, the image processing part 10A culls pixels for transforming the aforementioned actual image data into coarse image data, and stores the coarse image data in the coarse image data storage part 10C3 while displaying the coarse image on the display part 12 as an initial image (step S2). FIG. 5 shows a state of the display part 12 displaying the coarse image which is the initial image. A screen 50 is a display screen of the display part 12, and a display box 51 with the legend "document" is displayed on a part of this screen 50, so that the aforementioned coarse image is displayed on this display box 51. On the other hand, four command display fields 52A to 52D are displayed on the right side of the display box 51 on the screen 50. These command display fields 52A to 52D display selectable commands, so that the user can select a necessary command with the mouse for inputting an instruction in the control part 10. In this example, a USM command is displayed on the command display field 52C.

Referring again to FIG. 3, the processor waits until the USM command is selected at a step S3. The user selects the USM command by touching the command display field 52C or selecting the same by clicking the mouse. When the USM command is selected at the step S3, the process advances to a step S4 so that the extract processing part 10B performs partial image extract processing.

Figure 6:
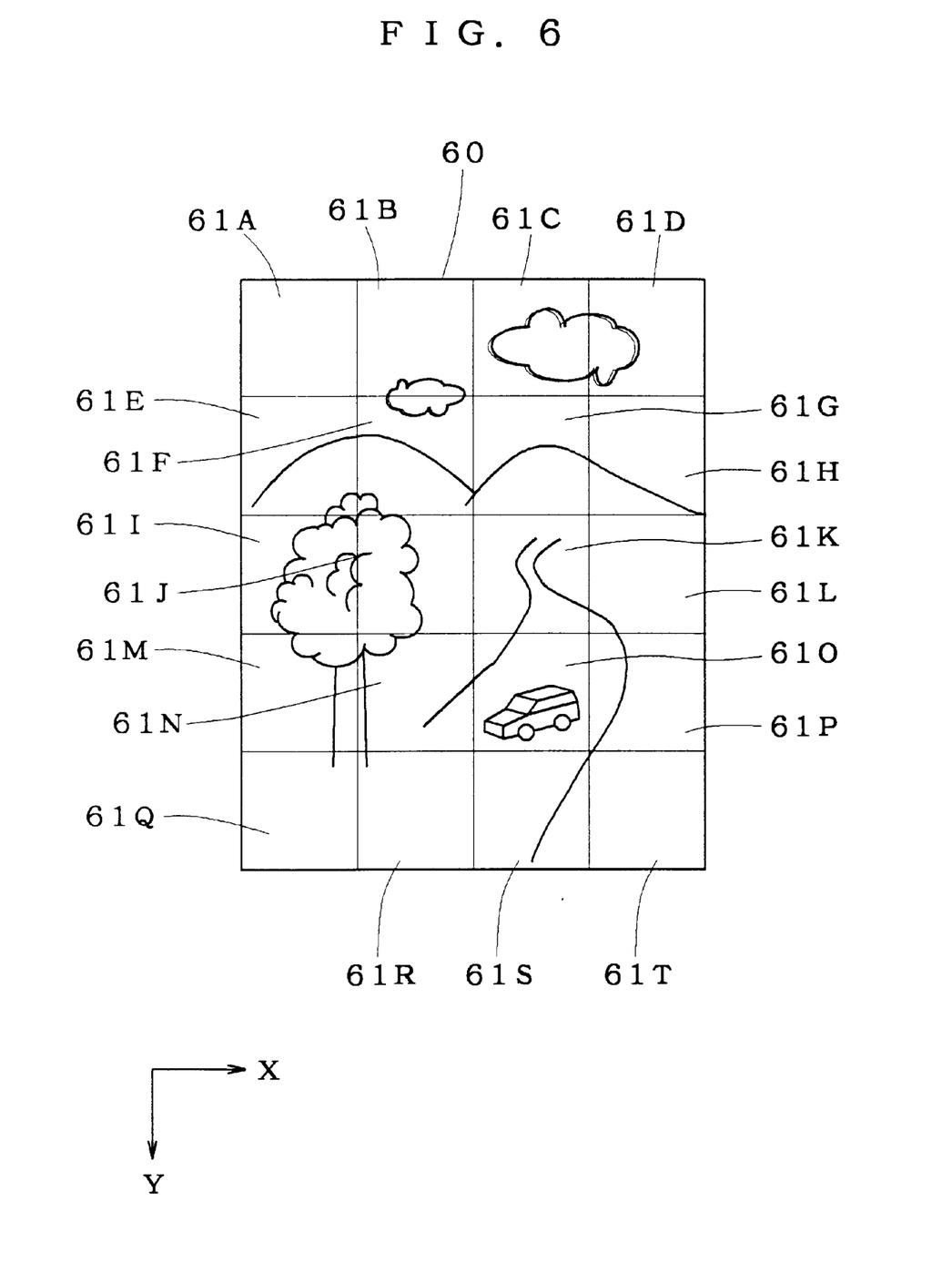
FIG. 6 is a diagram illustrating an exemplary state of an image divided into partial images.

FIG. 4 is a flow chart showing the procedure of the partial image extract processing. At a step S41, the image is divided into tile-like (matrix-type) divisional images. FIG. 6 shows the image which is divided into tile-like divisional images. This image division is performed on the overall image data stored in the actual image data storage part 10C4 at the step S1, such that an actual image 60 is divided into partial images 61A to 61T in this example. Each of these partial images 61A to 61T consists of a plurality of pixels. The image division processing shown in FIG. 6 is a processing which is conceptually performed in the extract processing part 10B, and not displayed on the display part 12.

Figure 7A:
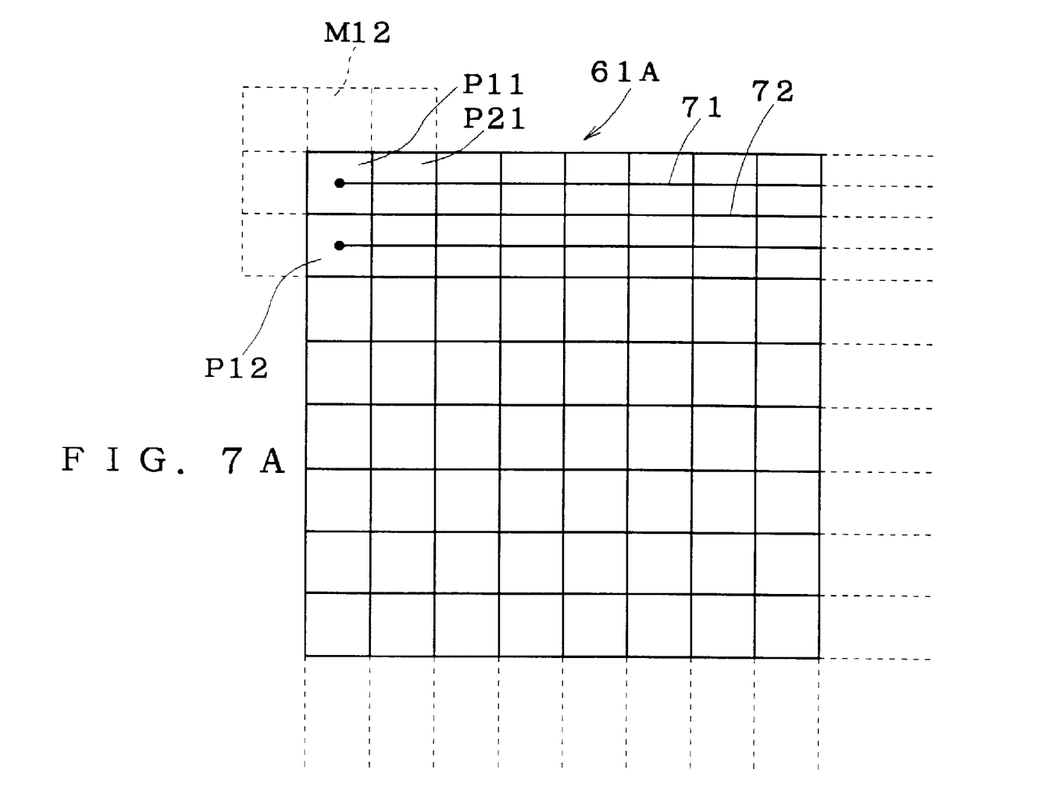
FIGS. 7A and 7B are conceptual diagrams for illustrating filtering processing.
Figure 7B:
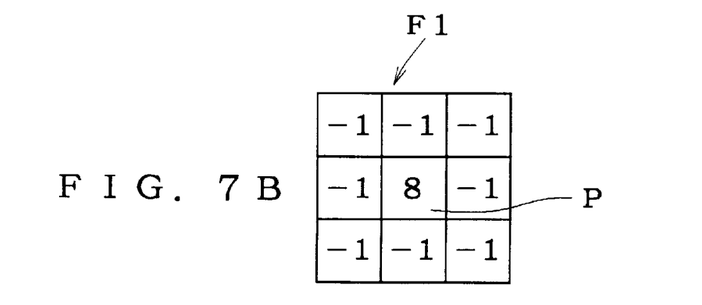

Then, filtering processing is performed at a step S42. FIGS. 7A and 7B are conceptual diagrams for illustrating this filtering processing. FIG. 7A is a pixel block diagram showing an upper left corner portion of the actual image 60 (upper left corner portion of the partial image 61A). While the filtering processing is performed on overall pixels of the actual image 60, only the upper left corner portion of the actual image 60 is shown in FIG. 7A for convenience of illustration, and respective ones of small squares correspond to the pixels.

FIG. 7B is a conceptual diagram of a Laplacian filter F1 employed in this example. The Laplacian filter F1 is formed by a matrix of 3 by 3 pixels, and adapted to multiply image data (indicating each pixel's density in this example) of the noted pixel P by "8", multiply image data of eight pixels which are adjacent to the noted pixel P by "−1", and add up the nine results of multiplication for forming a response value of the noted pixel P. Namely, the response value is low if change (spatial secondary differential) of the density difference between the noted pixel P and the pixels adjacent thereto is small, while the response value is high if the change of the density difference is large (at a boundary region of the image or the like).

As shown in FIG. 7A, the filtering processing is performed by defining a pixel P11 on the upper left corner portion of the actual image 60 as the first noted pixel and successively scanning a line 71 in FIG. 7A along a direction X (main scanning direction) by the Laplacian filter F1. When a pixel (not shown) on the opposite side of the pixel P11 is completely processed on the line 71, then pixels on a line 72 which is adjacent to the line 71 along a direction Y (subscanning direction) are successively processed from a pixel P12 along the direction X, so that a similar procedure is thereafter repeated. If the noted pixel is present on an end portion of the actual image 60 (in case of the pixel P11, for example), pixels which are adjacent to this noted pixel are partially absent. In this case, symmetric duplication is performed about the noted pixel, thereby setting virtual pixels. In relation to the noted pixel P11, for example, image data of a virtual pixel M12 is prepared by duplicating that of the pixel P12.

When the filtering processing is completed as to all pixels of the actual image 60 in the aforementioned manner, the process advances to a step S43 in FIG. 4, for finding the arithmetic mean of the filtering result in each region corresponding to each of the previously divided partial images. In other words, the arithmetic mean of the response values of the pixels included in each partial image is calculated. The result obtained in this manner corresponds to a spatial frequency distribution state of the image data in each partial image, such that a partial image having a high mean value has a large number of high frequency components (includes a number of image boundary regions) and that a partial image having a low mean value has a small number of high frequency components (has smooth density change of the image).

Then, the process advances to a step S44, for selecting partial images corresponding to the minimum value, the median and the maximum value of the spatial frequency mean values of the respective partial images obtained in the aforementioned manner. Assuming that the image is divided into N partial images, the partial image corresponding to the median is the N/2-th one from that having the highest spatial frequency mean value if N is an even number, or the (N+1)/2th one if N is an odd number. In this example, the partial image corresponding to the median is the tenth partial image from that having the highest spatial frequency mean value since the image is divided into 20 partial images. In this example shown in FIG. 6, the partial image 61A ("blue sky" partial image having smooth density change), the partial image 61L ("surface of mountain" partial image having intermediate density change) and the partial image 61O ("automobile" partial image including a number of boundary regions of a metal etc.) correspond to the minimum value, the median and the maximum value respectively.

Figure 8A:
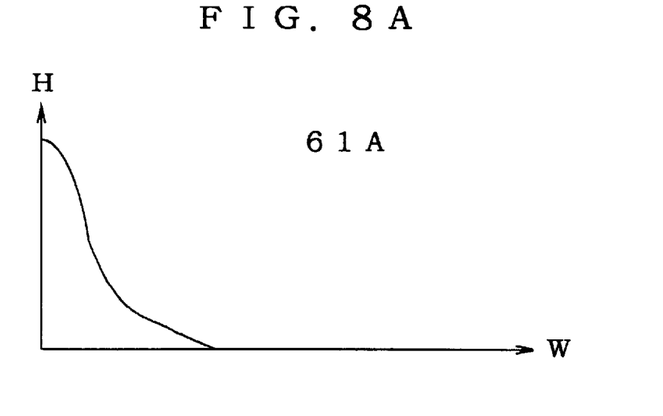
FIGS. 8A to C are diagrams showing exemplary spatial frequency distribution states of image data in respective partial images.
Figure 8B:
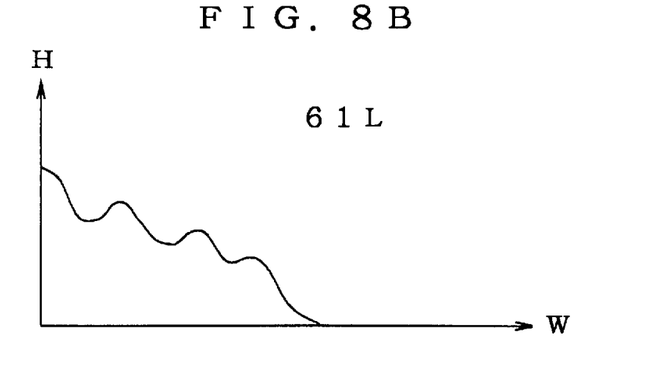
Figure 8C:
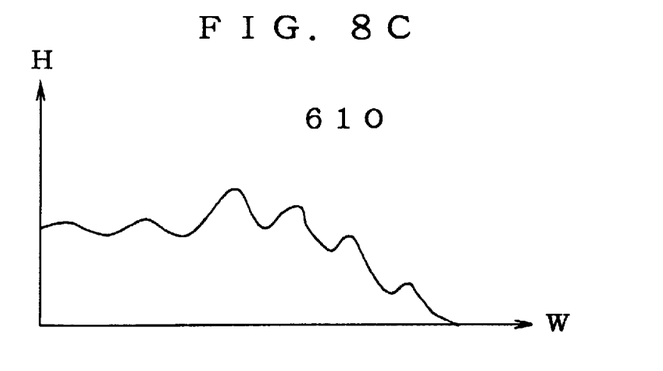

FIGS. 8A to 8C show the spatial frequency distribution states of the image data in these three partial images. In each figure, a horizontal axis indicates a spatial frequency, and a vertical axis indicates a response in relation to the spatial frequency. While the partial image 61A (FIG. 8A) has few high frequency components, the partial image 61O (FIG. 8C) includes a large number of high frequency components. On the other hand, the partial image 61L (FIG. 8B) includes a number of high frequency components falling intermediate those of the partial images 61A and 61O.

While the partial image corresponding to the median is extracted in the aforementioned manner in this example, a partial image having a spatial frequency mean value which is closest to the value (maximum value+minimum value)/2 may alternatively be regarded as the median partial image.

If two partial images have the same mean values defining the median, the first partial image may be regarded as that corresponding to the median, or the precedence may alternatively be decided based upon another condition (for example, a partial image having lower density is preferentially extracted).

Thus, the image data of the extracted three partial images are stored in the actual image data storage part 10C4 of FIG. 2 as the extracted actual image data.

Figure 9:
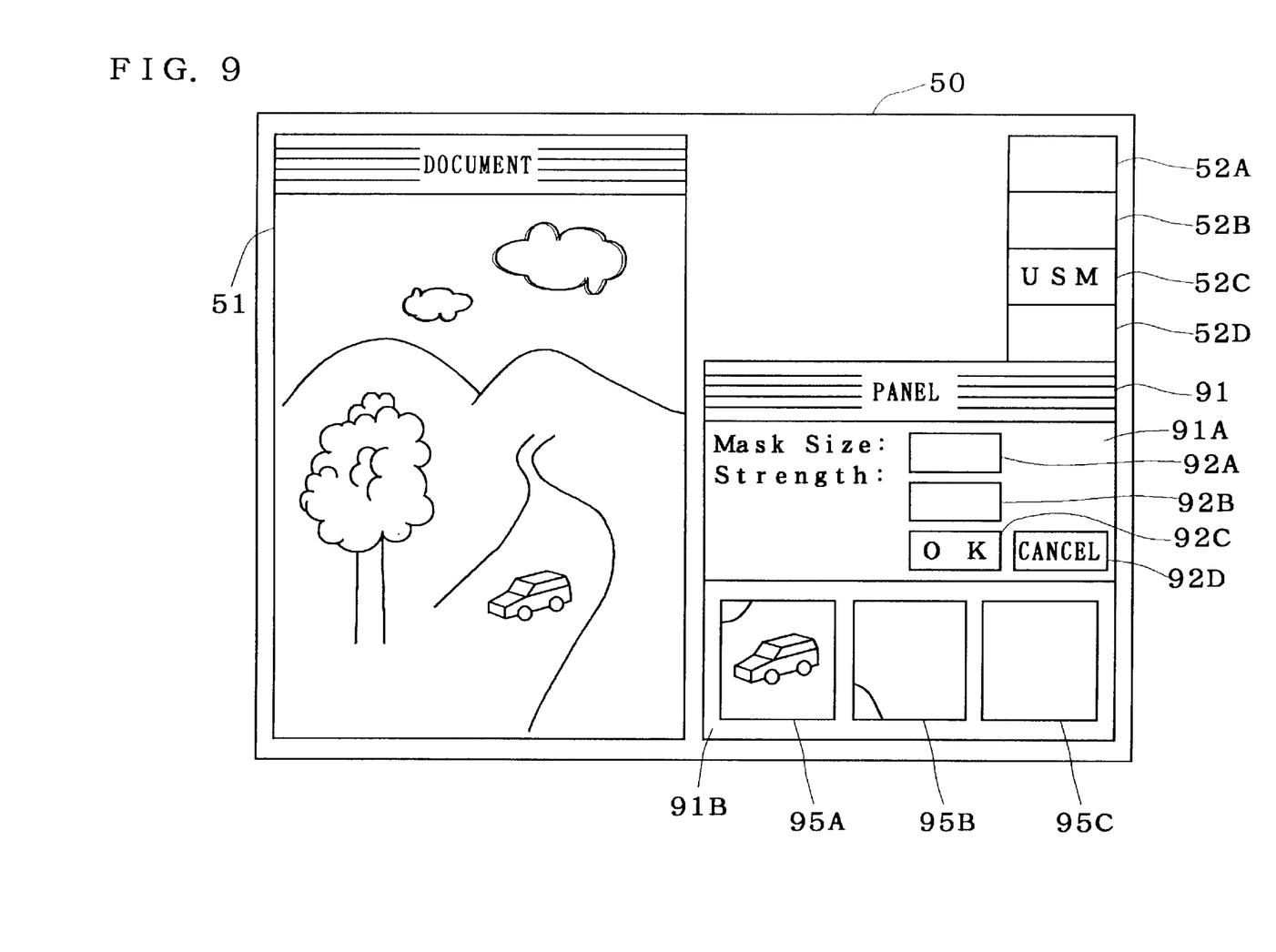
FIG. 9 is a diagram showing an exemplary display state of extracted partial images.

Referring again to FIG. 3, the aforementioned three extracted actual partial images are displayed on the display part 12 by the image processing part 10A (step S5). FIG. 9 illustrates how the extracted actual partial images are preferably displayed. The screen 50 is the display screen of the display part 12, and the display box 51 is presented on this screen 50. This display box 51 continuously displays the coarse overall image displayed as the initial image shown in FIG. 5. Further, the four command display fields 52A to 52D are also continuously displayed. A display box 91 with the legend "panel" is displayed under these command display fields 52A to 52D. This display box 91 displays a parameter input screen 91A and an extracted image display screen 91B. The aforementioned three extracted partial images, i.e., the partial images 61O, 61L and 61A are displayed on the extracted image display screen 91B successively from the left (on display positions 95A, 95B and 95C respectively). On the other hand, (1) a numerical display field 92A displaying the USM mask size (the size of the aforementioned neighbor region R),
(2) a numerical display field 92B displaying the USM strength (the aforementioned coefficient k),
(3) a command display field 92C saying "OK", and
(4) a command display field 92D saying "cancel"

are arranged on the parameter input screen 91A. The numerical display fields 92A and 92B display initial values previously set in this image processor 100.

Thus, the extracted image display screen 91b displays three extracted images, i.e. the partial images 61O, 61A and 61L. These partial images are noted portions that should be noted while USM parameters are adjusted, because the partial image 61O reacts most strongly to the USM parameters and the partial image 61A reacts most weakly to the USM parameters and the partial image 61L reacts intermediately to the USM parameters.

As above mentioned, since the noted portions are automatically extracted, even an unskilled user can readily set the USM parameters. While the extracted images are automatically extracted in this embodiment, a skilled user can determine a noted portion for selecting desired partial images, or automatically extracted partial images can be replaced with other ones.

Referring again to FIG. 3, the user inputs parameters corresponding to the mask size and the strength of USM through the operating part 11, whereby new values thereof are displayed on the numerical display fields 92A and 92B respectively. USM processing is performed on the image data of the three partial images on the basis of the new parameters (step S6). The USM-processed image data are substitutionally displayed on the display positions 95A, 95B and 95C respectively by the image processing part 10A.

Then, the process advances to a step S7, so that the user visually determines whether or not the results in the respective partial images are excellent. If USM is unsatisfactorily applied to the three partial images, the process returns to the step S6 so that the user again inputs parameters again to repeat the aforementioned steps.

When USM is excellently applied to the three partial images, on the other hand, the user selects the command display field 92C saying "OK", so that the aforementioned inputted parameters are settled as definite values. Then, the process advances to a step S8, so that the image processing part 10A performs USM processing on overall actual image data stored in the actual image data storage part 10C4 on the basis of the definite parameter values. Overall USM-processed actual image data are stored in the actual image data storage part 10C4, and displayed on the display box 51 as the USM-processed actual image.

Namely, every time the user inputs parameters according to the aforementioned procedure, three partial images are transformed into partial images to which USM is applied on the basis of inputted parameters and displayed. It comes to that this processing is repeated until the command display field 92C saying "OK" is selected.

According to the aforementioned procedure, the USM processing is performed only on the data of three partial images when the user adjusts USM parameters, whereby the number of pixels for USM processing is reduced and the processing time is also reduced. Particularly when adjustment of USM parameters is so difficult that the USM parameters are repeatedly inputted, the processing time can be remarkably reduced. Further, the user can adjust USM parameters with observing only three extracted images, whereby the USM adjustment time can be reduced.

Referring again to FIG. 3, a determination is made at a step S9 as to whether or not USM state of the overall actual image displayed on the display box 51 is excellent. If USM state of the overall actual image is unsatisfactory, the user selects the command display field 92D saying "cancel", so that the process returns to the step S6 for re-inputting the USM parameters.

If USM state of the overall actual image is excellent, on the other hand, the user inputs a print command through the operation part 11, so that the image output part 14 outputs the overall actual image (step S10).

While an example of the present invention has been described, the present invention is not restricted to the aforementioned example. While the image transform processing in the image processor according to this embodiment is contour enhancement, color tone adjustment or gradation curve adjustment may alternatively be employed. Statistic analysis in color tone adjustment may be performed on the basis of the degree of dispersion of colors and the content of a specific color (storage color, for example).

While the image is fixedly divided into partial images so that the arithmetic mean of the response values of the pixels included in each partial image is fixed in this embodiment, the image may not be divided into partial images but a window corresponding to a single partial image may alternatively be moved in units of pixels so that the in-window frequency distribution at each moved position is obtained as the local moving average of the response values of the pixels for regarding regions corresponding to the maximum value, the median and the minimum value thereof respectively as extracted images. According to this method, it is possible to more correctly extract the target image also when divisional lines of partial images and boundary portions of the image overlap with each other. However, the extract processing time is shortened when the structure of the aforementioned embodiment is employed.

While the invention has been shown and described in detail, the foregoing description is in all aspects illustrative and not restrictive. It is therefore understood that numerous modifications and variations can be devised without departing from the scope of the invention.

What is claimed is:

1. An apparatus for applying a predetermined image processing to an image consisting of pixels, said apparatus comprising:
    a) analyzing means for performing a statistical analysis of said image;
    b) sampling means for sampling a specific partial image from said image on the basis of a result of said analysis;
    c) display means for displaying said specific partial image;
    d) inputting means for inputting a tentative value for said image processing;
    e) pre-processing means for applying said image processing to said specific partial image, but less than said entire image, on the basis of said tentative value to thereby obtain a processed partial image;
    f) control means for controlling said display means to display said processed partial image;
    g) determining means for determining a definite value for said image after receipt of approval of said tentative value; and
    h) applying means for applying said image processing to said image on the basis of said definite value.

2. The apparatus of claim 1, wherein:
said image processing is unsharp masking process;
said analyzing means includes detecting means for detecting distribution of spacial frequency of image signals for a plurality of partial images of said image; and
said sampling means samples said specific partial image from said plurality of partial images of said image on the basis of said distribution of spacial frequency.

3. The apparatus of claim 2, wherein
said detecting means includes
    means for dividing said image into a matrix to define said respective partial images of said image.

4. The apparatus of claim 3, wherein
said detecting means further includes
    means for applying a spacial filter to each of said respective partial images of said image to determine said distribution of spacial frequency.

5. The apparatus of claim 3, wherein
said sampling means includes:
    means for calculating an average of said distribution of spacial frequency for each of said respective partial images of said image; and
    means for selecting
        1) a first partial image of said image providing a maximum of said average among said respective partial images of said image, and
        2) a second partial image of said image providing a minimum of said average among said respective partial images of said image; and
    means for determining said specific partial image as including said first and second partial images of said image.

6. A method of applying a predetermined image processing to an image consisting of pixels, said method comprising the steps of:
- a) performing a statistical analysis of said image;
- b) sampling a specific partial image from said image on the basis of a result of said analysis;
- c) displaying said specific partial image;
- d) inputting a tentative value for said image processing;
- e) applying said image processing to said specific partial image, but not to the entirety of said image, on the basis of said tentative value, to thereby obtain a processed partial image;
- f) displaying said processed partial image;
- g) determining a definite value for said image after receipt of approval of said tentative value; and
- h) applying said image processing to said image on the basis of said definite value.

7. The method of claim 6, wherein
said image processing is unsharp masking process;
said step a) includes the step of:
- a-1) detecting distribution of spacial frequency of image signals for a plurality of partial images of said image; and said step b) includes the step of:
- b-1) sampling said specific partial image from said plurality of partial images of said image on the basis of said distribution of spacial frequency.

8. The method of claim 7, wherein
said step a-1) includes the step of:
dividing said image into a matrix to define said respective partial images of said image.

9. The method of claim 8, wherein
said step a-1) further includes the step of:
applying a spacial filter to each of said respective partial images of said image to determine said distribution of spacial frequency.

10. The method of claim 8, wherein
said step b) includes the steps of:
calculating an average of said distribution of spacial frequency for each of said partial images of said image, and
selecting
1) a first partial image of said image providing a maximum of said average among said respective partial images of said image, and
2) a second partial image of said image providing a minimum of said average among said respective partial images of said image, and
determining said specific partial image as including said first and second partial images of said image.

11. An apparatus for applying an unsharp masking process to an image consisting of pixels, said apparatus comprising:
- a) analyzing means for performing a statistical analysis of said image, said analyzing means including detecting means for detecting a distribution of spacial frequency of image signals for a plurality of partial images of said image;
- b) sampling means for sampling a specific partial image from said image on the basis of a result of said analysis, said sampling means sampling said partial image from said plurality of partial images of said image on the basis of said distribution of spacial frequency;
- c) display means for displaying said specific partial image;
- d) inputting means for inputting a tentative value for said image processing;
- e) pre-processing means for applying said image processing to said specific partial image on the basis of said tentative value to thereby obtain a processed partial image;
- f) control means for controlling said display means to display said processed partial image;
- g) determining means for determining a definite value for said image after receipt of approval of said tentative value; and
- h) applying means for applying said image processing to said image on the basis of said definite value.

12. The apparatus of claim 11, wherein said detecting means includes means for dividing said image into a matrix to define said respective partial images of said image.

13. The apparatus of claim 12, wherein said detecting means further includes means for applying a spacial filter to each of said respective partial images of said image to determine said distribution of spacial frequency.

14. The apparatus of claim 12, wherein said sampling means includes:
means for calculating an average of said distribution of spacial frequency for each of said respective partial images of said image; and
means for selecting:
1) a first partial image of said image providing a maximum of said average among said respective partial images of said image;
2) a second partial image of said image providing a minimum of said average among said respective partial images of said image; and
means for determining said specific partial images including said first and second partial images of said image.

15. A method of applying an unsharp masking process to an image consisting of pixels, said method comprising the steps of:
- a) performing a statistical analysis of said image by carrying out a process including the step of detecting distribution of spacial frequency of image signals for a plurality of partial images of said image;
- b) sampling a specific partial image from said image on the basis of a result of said analysis by carrying out a process including the step of sampling specific partial image from said plurality of partial images of said image on the basis of said distribution of spacial frequency;
- c) displaying said specific partial image;
- d) inputting a tentative value for said image processing;
- e) applying said image processing to said specific partial image on the basis of said tentative vlaue, to thereby obtain a processed partial image;
- f) displaying said processed partial image;
- g) determining a definite value for said image after receipt of approval of said tentative value; and
- h) applying said image processing to said image on the basis of said definite value.

16. The method of claim 15, wherein said step of detecting distribution of said spacial frequency of image signals includes the steps of dividing said image into a matrix to define said respective partial images of said image.

17. The method of claim 16, wherein said step of detecting distribution of spacial frequency of image signals for a plurality of partial images of said image further includes the step of applying a spacial filter to each of said respective partial images of said image to determine said distribution of spacial frequency.

18. The method of claim 17, wherein said sampling step includes the steps of:

calculating an average of said distribution of spacial frequency for each said partial image of said image; and selecting:
   1) a first partial image of said image providing a maximum of said average among said respective partial images of said image;
   2) a second partial image of said image providing a minimum of said average among said respective partial images of said image; and determining said specific partial image as including said first and second partial images of said image.

* * * * *